US010701529B2

(12) United States Patent
Givol et al.

(10) Patent No.: US 10,701,529 B2
(45) Date of Patent: Jun. 30, 2020

(54) DYNAMIC RE-CONFIGURATION OF A USER INTERFACE BASED ON LOCATION INFORMATION

(71) Applicant: Capital One Services, LLC, McLean, VA (US)

(72) Inventors: Dan Givol, Arlington, VA (US); Benjamin Lindquist, Falls Church, VA (US); Victor Mayaki, Aldie, VA (US); Zviad Aznaurashvili, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/564,606

(22) Filed: Sep. 9, 2019

(65) Prior Publication Data
US 2019/0394622 A1    Dec. 26, 2019

Related U.S. Application Data

(63) Continuation of application No. 15/922,551, filed on Mar. 15, 2018, now Pat. No. 10,412,556.

(51) Int. Cl.
*H04W 4/18* (2009.01)
*H04W 4/02* (2018.01)
*H04M 1/725* (2006.01)
*G06F 16/29* (2019.01)
*H04L 29/08* (2006.01)

(52) U.S. Cl.
CPC .............. *H04W 4/18* (2013.01); *G06F 16/29* (2019.01); *H04M 1/72569* (2013.01); *H04M 1/72572* (2013.01); *H04W 4/025* (2013.01); *H04L 67/18* (2013.01)

(58) Field of Classification Search
CPC ......... H04W 4/18; H04W 4/025; G06F 16/29; H04M 1/72569; H04M 1/72572; H04L 67/18
See application file for complete search history.

(56) References Cited

U.S. PATENT DOCUMENTS

| 6,092,101 A | 7/2000 | Birrell et al. |
| 6,119,014 A | 9/2000 | Alperovich et al. |
| 6,169,498 B1 | 1/2001 | King et al. |
| 6,185,551 B1 | 2/2001 | Birrell et al. |
| 7,461,528 B2 | 12/2008 | Taniguchi et al. |
| 7,787,857 B2 | 8/2010 | Peterman et al. |
| 10,412,556 B1 | 9/2019 | Givol et al. |
| 2009/0181651 A1 | 7/2009 | Klassen et al. |

(Continued)

*Primary Examiner* — Andrew T Chiusano
(74) *Attorney, Agent, or Firm* — Harrity & Harrity, LLP

(57) ABSTRACT

A device may receive location information that identifies a location of a user device associated with an individual. The location information may be received from the user device. The device may determine a distance between the location of the user device and each of a set of third party locations of a set of third parties using a digital map after receiving the location information. The device may provide a set of instructions to configure a user interface of an application associated with the user device to display messages of an electronic messaging account associated with the set of third parties after determining the distance between the location of the user device and each of the set of third party locations.

20 Claims, 7 Drawing Sheets

(56) References Cited

U.S. PATENT DOCUMENTS

| | | |
|---|---|---|
| 2010/0026526 A1 | 2/2010 | Yokota et al. |
| 2010/0235447 A1 | 9/2010 | Goodman et al. |
| 2011/0060803 A1 | 3/2011 | Barlin et al. |
| 2012/0290389 A1 | 11/2012 | Greenough et al. |
| 2014/0058825 A1* | 2/2014 | Raman .................. G06Q 30/02 705/14.42 |
| 2016/0105387 A1 | 4/2016 | Jackson et al. |
| 2017/0364213 A1 | 12/2017 | Vairamohan et al. |
| 2018/0048595 A1 | 2/2018 | Dotan et al. |
| 2018/0083905 A1 | 3/2018 | Jayaram et al. |
| 2019/0306090 A1* | 10/2019 | Shang .................... H04L 51/20 |

* cited by examiner

DYNAMIC RE-CONFIGURATION OF A USER INTERFACE BASED ON LOCATION INFORMATION

RELATED APPLICATION

This application is a continuation of U.S. patent application Ser. No. 15/922,551, filed Mar. 15, 2018 (now U.S. Pat. No. 10,412,556), the content of which is incorporated herein by reference in its entirety.

BACKGROUND

A display of a user device may display a user interface (e.g., a graphical user interface). A user interface may permit interactions between a user of the user device and the user device. In some cases, the user may interact with the user interface to operate and/or control the user device to produce a desired result. For example, the user may interact with the user device to cause the user device to perform an action. Additionally, the user interface may provide information to the user.

SUMMARY

According to some possible implementations, a device may comprise one or more memories, and one or more processors, communicatively coupled to the one or more memories, configured to receive location information that identifies a location of a user device associated with an individual. The location information may be received from the user device. The one or more processors may be configured to determine a distance between the location of the user device and each of a set of third party locations of a set of third parties using a digital map after receiving the location information. The one or more processors may be configured to provide a set of instructions to configure a user interface of an application associated with the user device to display messages of an electronic messaging account associated with the set of third parties after determining the distance between the location of the user device and each of the set of third party locations.

According to some possible implementations, a non-transitory computer-readable medium may store one or more instructions that, when executed by one or more processors, cause the one or more processors to receive location information that identifies a location of a user device associated with an individual. The location information may be received from the user device. The one or more instructions, when executed by the one or more processors, may cause the one or more processors to determine a distance between the location of the user device and each of a set of third party locations of a set of third parties using a digital map after receiving the location information. The set of third parties may be associated with messages of a messaging account associated with the individual. The one or more instructions, when executed by the one or more processors, may cause the one or more processors to determine a manner in which the messages are to be provided for display after determining the distance between the location of the user device and each of the set of third party locations. The one or more instructions, when executed by the one or more processors, may cause the one or more processors to provide a set of instructions to configure a user interface of an application associated with the user device to display the messages after determining the manner in which the messages are to be provided for display.

According to some possible implementations, a method may comprise receiving, by a device, location information from a sensor of the device associated with an individual. The location information may identify a location of the device. The individual may be associated with an electronic messaging account that includes messages associated with a set of third parties. The method may include determining, by the device, a distance between the location of the device and each of a set of third party locations of the set of third parties using a digital map after receiving the location information. The method may include determining, by the device, a manner in which the messages are to be provided for display based on the distance between the location of the device and each of the set of third party locations of the set of third parties. The method may include providing, by the device, a set of instructions to configure a user interface of an application associated with the device to display the messages in the manner determined by the device.

DETAILED DESCRIPTION

The following detailed description of example implementations refers to the accompanying drawings. The same reference numbers in different drawings may identify the same or similar elements.

An electronic account may be associated with dozens, hundreds, or thousands of messages from dozens, hundreds, or thousands of third parties. As new messages are received by the electronic messaging account, older messages are typically pushed further down, or de-prioritized, in an inbox or other folder of the electronic messaging account. When a user of the electronic messaging account needs to view a particular message, the user may have to manually input search parameters into a user interface associated with the electronic messaging account and/or manually navigate through folders of the electronic messaging account to try to locate the message. While these techniques may occasionally produce a desired message, the success of these techniques relies on the user of the electronic messaging account inputting accurate search parameters associated with the message and/or being able to recognize the message among many other messages. This consumes processing resources of devices associated with hosting and/or accessing the electronic messaging account via inefficient use of a user interface associated with the electronic messaging account.

In addition, this consumes time of the user of the electronic messaging account. Further, some messages in the electronic messaging account may be relevant or of interest to the user at particular times, even if the user has not thought to search for the messages, such as when the user is located at a third party location associated with a third party.

Some implementations, described herein, provide a message configuration platform that is capable of dynamically re-configuring a user interface to display information related to a set of messages associated with a location. In this way, the message configuration platform can dynamically serve message-related information to a user of a user device based on the location of the user device. This reduces or eliminates a need for the user to have to use a user interface to manually search through an electronic messaging account to identify messages associated with the location or a party at the location, thereby improving an efficiency of serving messages of an electronic messaging account to a user of the electronic messaging account. In addition, this conserves processing resources of devices that host the electronic messaging account and/or that provide access to the electronic messaging account, by reducing or eliminating inefficient use of a user interface associated with the electronic messaging account. Further, this improves an ease with which messages associated with a location can be accessed, thereby improving access to the messages.

Figure 1:
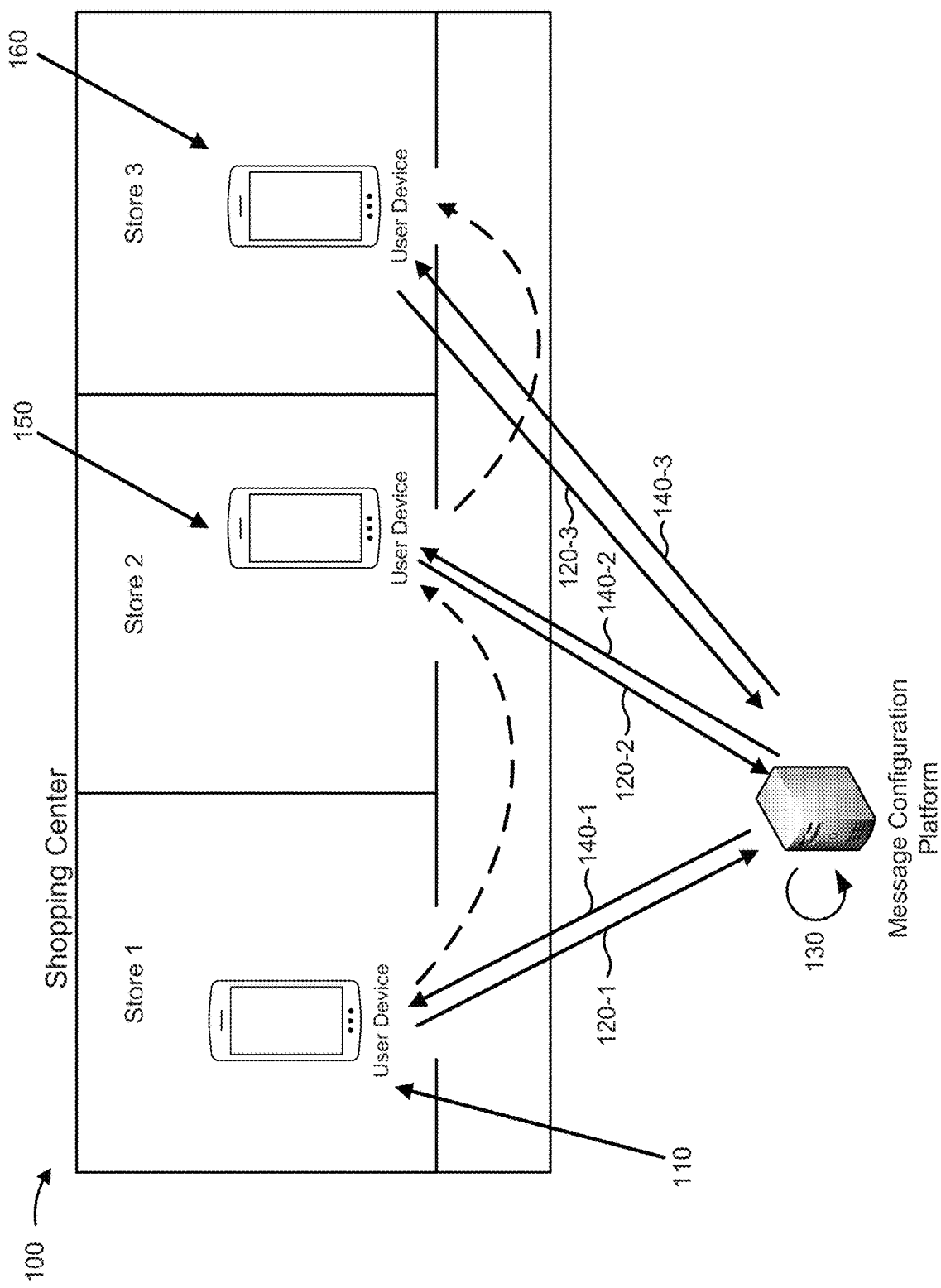
FIG. 1 is a diagram of an overview of an example implementation described herein.

FIG. 1 is a diagram of an overview of an example implementation 100 described herein. As shown in FIG. 1, implementation 100 includes a user device and a message configuration platform.

As shown by reference number 110, the user device may be located in store 1 of a shopping center. For example, an individual with which the user device is associated may have carried the user device into store 1. As shown by reference number 120-1, the user device may provide, to the message configuration platform, location information that identifies a location of the user device. For example, the location information may identify a set of coordinates for the user device, an identifier for store 1, a geographic location of the user device, global positioning system (GPS) information for the user device, and/or the like.

As shown by reference number 130, the message configuration platform may determine a ranking of messages, e.g., of an electronic messaging account, associated with the individual. For example, the ranking may be based on a distance between the location of the user device and each of a set of other locations (e.g., locations for store 1 through store 3). In this case, because the user device is located in store 1, the message configuration platform may determine that the user device is closer to a location for store 1 relative to a location for store 2, which is closer to the location of the user device relative to the location for store 3. As such, the message configuration platform may determine that a message associated with store 1, in the electronic messaging account, is to have a higher ranking relative to a message associated with store 2, which is to have a higher ranking relative to a message associated with store 3 based on the relative locations of stores 1 through 3 to the location of the user device.

In some cases, the user device, rather than the message configuration platform, may determine a ranking of messages. For example, an application installed on the user device may determine a ranking of messages. The ranking of messages (by the message configuration platform and/or the user device) may be done across various electronic messaging accounts (e.g., a voicemail messaging account, a text messaging account, etc.). This facilitates a cross-account and/or consolidated view of messages (e.g., a list of messages that includes emails, voicemails, texts, etc.), thereby improving access to messages from various electronic messaging accounts and conserving processing resources that would otherwise be consumed via switching between electronic messaging accounts. For example, if the user device is at a particular location information related to messages from different types of electronic messaging accounts could be provided for display via a single application installed on the user device.

As shown by reference number 140-1, the message configuration platform may provide, to the user device, a set of instructions to configure a user interface of an application to display the messages based on the ranking. For example, in a list of messages, the set of instructions may cause the application (e.g., an email client, an electronic wallet, a shopping application, etc.) to display messages associated with store 1 at the top of the list, messages associated with store 2 below the messages for store 1, and the messages for store 3 below the messages for store 2. In this way, any messages in the electronic messaging account related to a location close to the user device may be easily and quickly accessible. For example, for store 1, messages that might include coupon offers, a rewards point offer, an order confirmation (e.g., for in-store pick-up), and/or the like for store 1 may be quickly and easily accessible by a user of the user device while the user is at, or near, store 1.

As shown by reference number 150, the user device may be moved to a different location (e.g., to store 2). As shown by reference numbers 120-2, 130, and 140-2, the message configuration platform may re-configure the manner in which the user interface displays the messages in the electronic messaging account based on the change in location of the user device, in a manner similar to that described above with regard to reference numbers 120-1, 130, and 140-1. In some situations, such as when the user device is located at store 2, the user device may be within a threshold distance of multiple other locations (e.g., locations of store 1 and store 3). In this case, the message configuration platform may adjust a ranking for messages based on one or more factors other than distance between locations. For example, the message configuration platform may determine a higher ranking for a location associated with a higher quantity of messages, associated with more recent messages relative to another location, associated with messages that include particular terms and/or phrases, and/or the like. In this way, the message configuration platform may determine a tie breaker between messages associated with different locations.

As further shown in FIG. 1, and by reference numbers 160, 120-3, 130, and 140-3, the message configuration platform may continue to dynamically determine a ranking of messages in an electronic messaging account and may dynamically re-configure the manner in which the messages are displayed via a user interface based on the change in location of the user device. For example, the message configuration platform may perform these functions in a manner similar to that described above with regard to reference numbers 120-1 and 120-2; 130; and 140-1 and 140-2.

In this way, the message configuration platform may monitor a location of a user device and may dynamically re-configure a manner in which messages of an electronic messaging account are provided for display via a user interface. This reduces an amount of time needed to access a message in an electronic messaging account that is associated with a location of the user device. In addition, this reduces or eliminates a need for a user to have to perform one or more searches of the electronic messaging account using a user interface associated with the electronic messaging account to identify a set of messages associated with a location. Further, this improves access to, and/or use of, information in messages, by facilitating easier and quicker access to the messages.

As indicated above, FIG. 1 is provided merely as an example. Other examples are possible and may differ from what was described with regard to FIG. 1. For example, some implementations described as being performed by the message configuration platform may be performed by the user device (e.g., an application installed on the user device) and/or a server device (e.g., that hosts the electronic messaging account).

Figure 2:
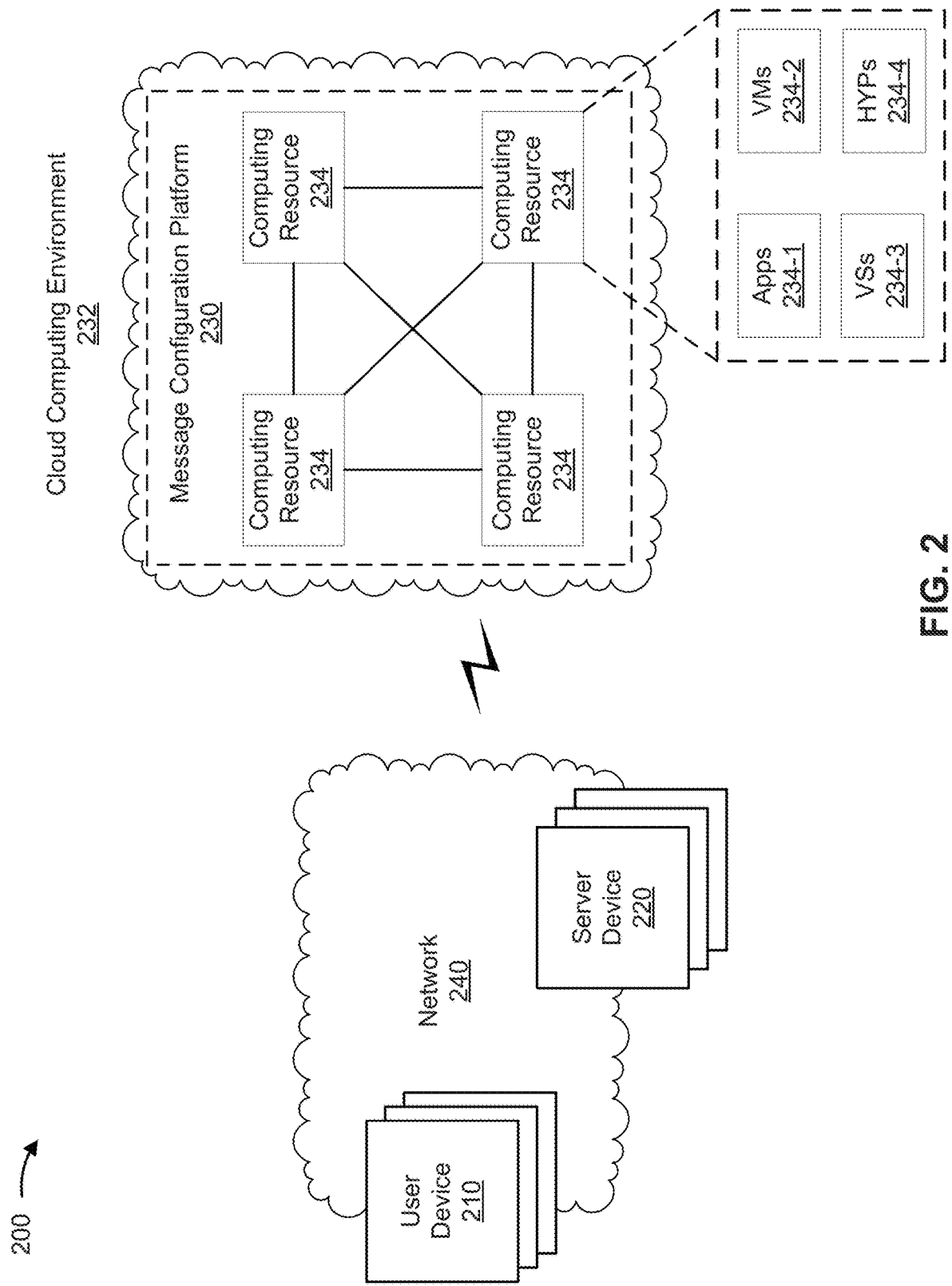
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include user device 210, server device 220, message configuration platform 230 within cloud computing environment 232 that includes a set of computing resources 234, and network 240. Devices of environment 200 may interconnect via wired connections, wireless connections, or a combination of wired and wireless connections.

User device 210 includes one or more devices capable of receiving, generating, storing, processing, and/or providing information associated with configuring a user interface based on a location of user device 210. For example, user device 210 may include a desktop computer, a mobile phone (e.g., a smart phone, a radiotelephone, etc.), a laptop computer, a tablet computer, a handheld computer, a gaming device, a virtual reality device, a wearable communication device (e.g., a smart wristwatch, a pair of smart eyeglasses, etc.), or a similar type of device. In some implementations, user device 210 may provide, to message configuration platform 230, location information related to user device 210, as described elsewhere herein. Additionally, or alternatively, user device 210 may receive, from message configuration platform 230, a set of instructions for configuring a user interface based on the location information, as described elsewhere herein.

Server device 220 includes one or more devices capable of receiving, generating, storing, processing, and/or providing information associated with a location of user device 210 and/or an electronic messaging account. For example, server device 220 may include a server (e.g., in a data center or a cloud computing environment), a data center (e.g., in a multi-server micro data center), a workstation computer, a virtual machine (VM) provided in a cloud computing environment, or a similar type of device. In some implementations, server device 220 may host an electronic messaging account, as described elsewhere herein. Additionally, or alternatively, server device 220 may perform a search for one or more locations on a digital map, as described elsewhere herein.

Message configuration platform 230 includes one or more devices capable of receiving, generating, storing, processing, and/or providing information associated with configuring a user interface to display information related to a set of messages. For example, message configuration platform 230 may include a cloud server or a group of cloud servers. In some implementations, message configuration platform 230 may be designed to be modular such that certain software components can be swapped in or out depending on a particular need. As such, message configuration platform 230 may be easily and/or quickly reconfigured for different uses.

In some implementations, as shown in FIG. 2, message configuration platform 230 may be hosted in cloud computing environment 232. Notably, while implementations described herein describe message configuration platform 230 as being hosted in cloud computing environment 232, in some implementations, message configuration platform 230 may not be cloud-based (i.e., may be implemented outside of a cloud computing environment) or may be partially cloud-based.

Cloud computing environment 232 includes an environment that hosts message configuration platform 230. Cloud computing environment 232 may provide computation, software, data access, storage, and/or other services that do not require end-user knowledge of a physical location and configuration of a system and/or a device that hosts message configuration platform 230. As shown, cloud computing environment 232 may include a group of computing resources 234 (referred to collectively as "computing resources 234" and individually as "computing resource 234").

Computing resource 234 includes one or more personal computers, workstation computers, server devices, or another type of computation and/or communication device. In some implementations, computing resource 234 may host message configuration platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, one or more virtualized storages ("VSs") 234-3, or one or more hypervisors ("HYPs") 234-4.

Application 234-1 includes one or more software applications that may be provided to or accessed by one or more devices of environment 200. Application 234-1 may eliminate a need to install and execute the software applications on devices of environment 200. For example, application 234-1 may include software associated with message configuration platform 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of user device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
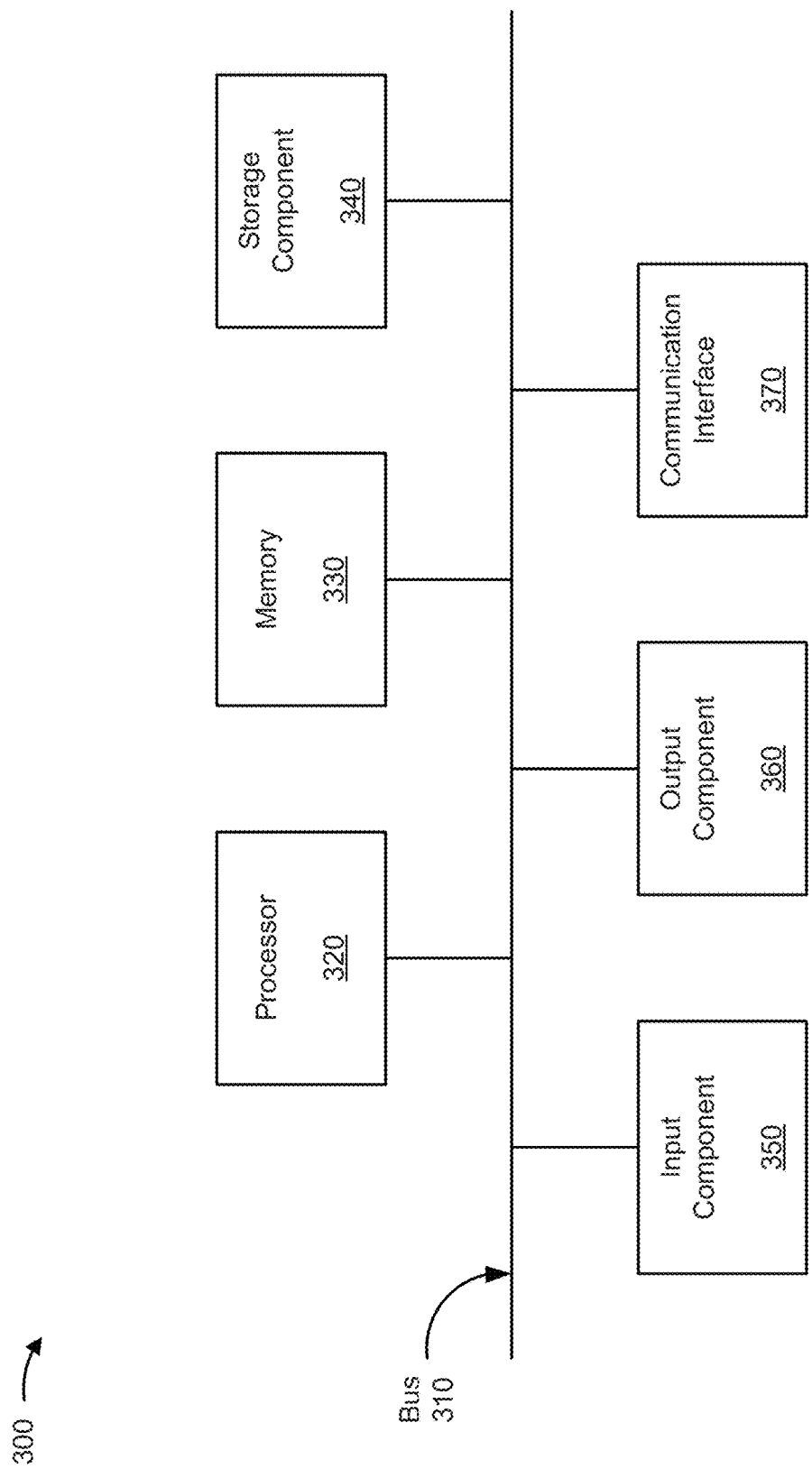
FIG. 3 is a diagram of example components of one or more devices of FIG. 2.

FIG. 3 is a diagram of example components of a device 300. Device 300 may correspond to user device 210, server device 220, message configuration platform 230, and/or computing resource 234. In some implementations, user device 210, server device 220, message configuration platform 230, and/or computing resource 234 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
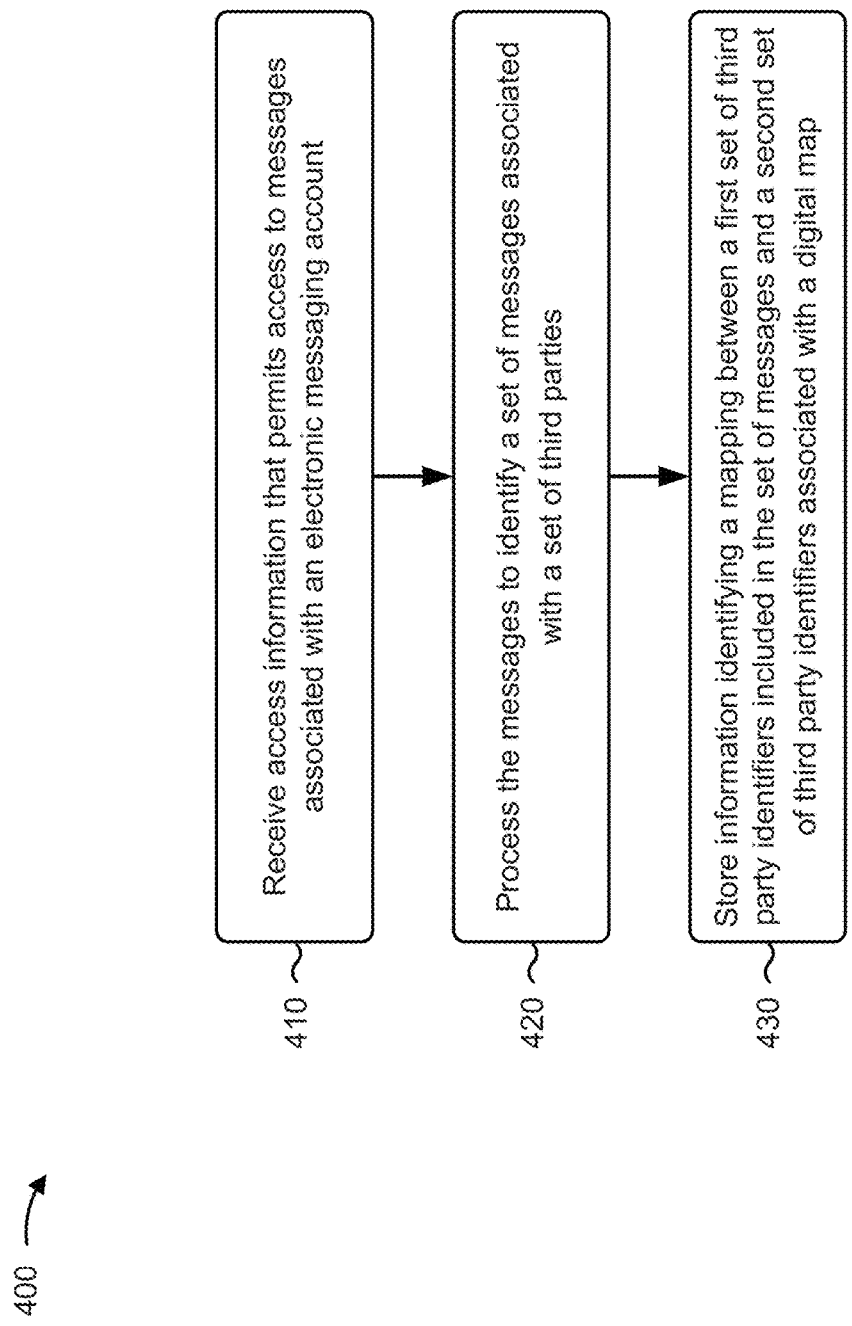
FIG. 4 is a flow chart of an example process for dynamic re-configuration of a user interface based on location information.

FIG. 4 is a flow chart of an example process 400 for dynamic re-configuration of a user interface based on location information. In some implementations, one or more process blocks of FIG. 4 may be performed by message configuration platform 230. In some implementations, one or more process blocks of FIG. 4 may be performed by another device or a group of devices separate from or including message configuration platform 230, such as user device 210, server device 220, and computing resource 234.

As shown in FIG. 4, process 400 may include receiving access information that permits access to messages associated with an electronic messaging account (block 410). For example, message configuration platform 230 may receive (e.g., using computing resource 234, processor 320, communication interface 370, and/or the like) access information that permits access to messages associated with an electronic messaging account. In some implementations, message configuration platform 230 may receive the access information based on requesting the access information, based on a user of user device 210 inputting the access information (e.g., via a user interface, an application executing on user device 210, etc.), and/or the like.

In some implementations, the access information may include a set of credentials associated with an electronic messaging account, a username/password combination, a security token (e.g., that provides limited access to an electronic messaging account), and/or the like. For example, the access information may permit message configuration platform 230 to access messages associated with an electronic messaging account (e.g., for a limited amount of time, stored in a particular folder associated with the electronic messaging account, such as an inbox or a spam folder, etc.).

In some implementations, a message may include an email, a text message, an instant message, a voicemail, a push notification, and/or the like. In some implementations, an electronic messaging account may include an email account, an instant messaging account, a text messaging account, a voicemail account, and/or the like. In some implementations, server device 220 may host the electronic messaging account (e.g., may store a message, may store information used to verify access information, etc.). In some implementations, message configuration platform 230 may host the electronic messaging account (e.g., may store a message, may store information used to verify access information, etc.), in which case, message configuration platform 230 may not need to receive the access information to access the electronic messaging account. In some implementations, an electronic messaging account may be associated with one or more messages.

In some implementations, message configuration platform 230 may receive the access information related to accessing the electronic messaging account prior to processing a message associated with the electronic messaging account. In some implementations, message configuration platform 230 may access the electronic messaging account by providing, to another device (e.g., server device 220), the access information after receiving the access information.

In some implementations, user device 210 may receive access information rather than message configuration platform 230. For example, a user of user device 210 may input access information into a user interface of an application installed on user device 210.

In this way, message configuration platform 230 may receive access information that permits access to messages prior to processing the messages.

As further shown in FIG. 4, process 400 may include processing the messages to identify a set of messages associated with a set of third parties (block 420). For example, message configuration platform 230 may process (e.g., using computing resource 234, processor 320, and/or the like) the messages to identify a set of messages associated with a set of third parties.

In some implementations, a third party may include a party not associated with the electronic messaging account, user device 210, and/or message configuration platform 230. For example, a third party may include an organization, such as a business, or an individual. In some implementations, an individual associated with user device 210 and/or the electronic messaging account may transact with a third party and the electronic messaging account associated with the individual may receive a set of messages from a device associated with the third party.

In some implementations, message configuration platform 230 may process a message associated with the electronic messaging account to identify an identifier that identifies a third party with which the message is associated. For example, the identifier may include a name of an organization or an individual, a name of a loyalty/rewards/membership program, a domain name, a telephone number, an email address, and/or the like. In some implementations, message configuration platform 230 may analyze metadata or other data associated with the message to identify the identifier.

In some implementations, message configuration platform 230 may process multiple messages associated with the electronic messaging account based on receiving the access information. In some implementations, message configuration platform 230 may identify, based on processing the multiple messages, particular information in one or more of the multiple messages. For example, the particular information may include domain information (e.g., a domain name) for a third party and/or or information that identifies the third party, such as a name of the third party, a logo of the third party, and/or the like.

In some implementations, message configuration platform 230 may process text associated with a message using a text processing technique, such as a natural language processing technique, a text analysis technique, a computational linguistics technique, and/or the like. For example, message configuration platform 230 may process text to identify a term, a phrase, a symbol, and/or the like included in a message. Additionally, or alternatively, message configuration platform 230 may process audio associated with a message using an audio processing technique, such as a speech-to-text technique, an automatic speech recognition (ASR) technique, a computer speech recognition technique, and/or the like. For example, message configuration platform 230 may process audio to identify a term and/or phrase included in the audio. Additionally, or alternatively, message configuration platform 230 may process an image associated with a message using an image processing technique, such as a computer vision technique, an optical character recognition (OCR) technique, a feature detection technique, and/or the like. For example, message configuration platform 230 may process an image to identify a term, a phrase, a symbol, a logo, and/or the like included in an image in a message. Additionally, or alternatively, and as another example, message configuration platform 230 may process an image of a scanned or photographed receipt to identify a third party associated with the receipt and/or other information related to a transaction associated with the receipt.

As a specific example, in some implementations, message configuration platform 230 may process a message to identify a domain name that includes an identifier associated with a third party (e.g., a name of the third party, a website of the third party, etc.). Additionally, or alternatively, and as another example, message configuration platform 230 may process a message to identify text that includes an identifier associated with a third party. Additionally, or alternatively, and as another example, message configuration platform 230 may process a message to identify an image that includes an identifier associated with a third party, such as a logo.

In some implementations, message configuration platform 230 may identify messages associated with the electronic messaging account prior to processing one or more of the messages. For example, message configuration platform 230 may identify messages in an inbox, or another folder, of the electronic messaging account, messages that have been archived, and/or the like.

In some implementations, message configuration platform 230 may determine that one or more of the messages are to be processed and/or that one or more other messages are not to be processed based on information associated with the one or more messages and/or the one or more other messages. For example, message configuration platform 230 may identify messages that have been tagged as private by a user of user device 210 (e.g., indicating that the messages are not to be processed). In some implementations, message configuration platform 230 may process only those messages associated with a third party identifier identified on a list of third party identifiers approved for processing (e.g., a whitelist). Conversely, in some implementations, message configuration platform 230 may process messages associated with any third party identifier except messages associated with a third party identifier included in a list of prohibited third party identifiers (e.g., a blacklist).

Additionally, or alternatively, and as another example, message configuration platform 230 may use machine learning to identify messages that are to be processed and/or that are not to be processed (e.g., messages that are likely to be personal messages or messages that an owner of the electronic messaging account would want to be kept private). Continuing with the previous example, message configuration platform 230 may use machine learning to identify messages that are to be processed and/or that are not to be processed based on terms and/or phrases included in the subjects of the messages (e.g., where the terms and/or phrases indicate that the messages are likely personal messages that a user associated with the electronic messaging account would want to be kept private), a quantity of messages exchanged in a chain of messages (e.g., where a threshold quantity of messages may indicate that the messages are personal), and/or the like.

As a specific example, by using machine learning, message configuration platform 230 may be capable of distinguishing between messages that are from a third party and messages that are merely related to the third party. Continuing with the previous example, message configuration platform 230 may be capable of distinguishing between an order confirmation from a third party retailer and an email that includes a news article related to the third party retailer. Additionally, or alternatively, message configuration platform 230 may use machine learning to distinguish between different types of messages for a third party. For example, message configuration platform 230 may use machine learning to distinguish between an order confirmation from a third party, a coupon offer from the third party, a spam message from the third party, and/or the like. This facilities prioritization of messages associated with a third party (described below).

In some implementations, this distinction may be based on a score that message configuration platform 230 associates with different messages. For example, the score may indicate a likelihood that a message is from a third party or is relevant to a location of the third party (rather than merely being associated with the third party, as in a news article) and may be based on combinations of terms and/or phrases included in the message, a source of the message (e.g., a domain name associated with the message), a quantity of words in the message, and/or the like. Message configuration platform 230 may have been trained on a training set of data that identifies messages likely to be from a third party, such as order confirmations, coupon offers, and/or account updates, and messages merely associated with the third party, such as news articles, phishing emails, spam, and/or the like.

This improves processing of messages and/or conserves processing resources of message configuration platform 230 by reducing a quantity of messages that message configuration platform 230 processes. Further, using machine learning facilitates processing of structured or unstructured data related to the messages, thereby reducing or eliminating a need for manual review by a human actor. Further, this facilitates processing of hundreds, thousands, millions, or more messages, thereby facilitating processing of a higher quantity of messages and/or in a shorter amount of time than a human actor. Further, this facilitates objective processing of data, where a human actor would inject subjectivity into processing of the data.

Additionally, or alternatively, and as additional examples, message configuration platform 230 may identify messages that are not to be processed based on the messages being from particular sources (e.g., identified in a data structure input by a user of user device 210), a folder into which the messages are organized, a set of rules, and/or the like. In some implementations, message configuration platform 230 may process the one or more messages after determining that the one or more messages are to be processed.

In some implementations, message configuration platform 230 may identify a match between an identifier for a third party (e.g., a third party identifier) included in a message and another identifier for the third party associated with a digital map. For example, a digital map may include an image of a geographic area (e.g., a satellite image, a street map image, etc.) that is provided for display via a display of a device. For example, message configuration platform 230 may identify a match between a domain name of a third party associated with a message and a name of the third party associated with the digital map. In some implementations, message configuration platform 230 may identify the match by performing a lookup of the third party identifier from the message in a data structure and identifying a corresponding identifier for the third party associated with the digital map where a result of the lookup indicates a match.

Additionally, or alternatively, message configuration platform 230 may match a root of a third party identifier associated with a message and a root of an identifier associated with a digital map. For example, the root of the domain name "thirdpartyA.com" might be "thirdpartyA," which message configuration platform 230 matches to the identifier "ThirdPartyA, Inc." associated with a digital map. Additionally, or alternatively, message configuration platform 230 may perform a search of the third party identifier associated with a message and may identify a match where a result of performing the search indicates a threshold similarity between the third party identifier and a set of third party identifiers.

By identifying a match between an identifier associated with a message and an identifier associated with a digital map, message configuration platform 230 can identify a location of a third party on a digital map by identifying the location of the third party on the digital map using the identifier for the third party associated with the digital map. This conserves processing resources of message configuration platform 230 by providing a quick and easy way for message configuration platform 230 to identify a location of a third party.

In some implementations, message configuration platform 230 may tag a message after processing the message. For example, message configuration platform 230 may tag a message with another identifier (e.g., based on a match between an identifier included in the message and a set of identifiers associated with a digital map). For example, the other identifier may identify the message as being associated with a third party. In some implementations, by tagging a message, message configuration platform 230 may form a tagged message.

In some implementations, message configuration platform 230 may tag a message within an electronic messaging account. In some implementations, message configuration platform 230 may configure a flag, a label, and/or the like associated with a message to tag a message. Additionally, or alternatively, message configuration platform 230 may store information identifying tagged messages (e.g., in server device 220). In some implementations, message configuration platform 230 may store, in a data structure, information identifying a message to tag the message. Additionally, or alternatively, server device 220 (e.g., on which messages are stored) may store information identifying tagged messages.

In this way, message configuration platform 230 may process the messages to identify a set of messages associated with a set of third parties prior to storing information identifying a mapping between a first set of third party identifiers and a second set of third party identifiers.

As further shown in FIG. 4, process 400 may include storing information identifying a mapping between a first set of third party identifiers included in the set of messages and a second set of third party identifiers associated with a digital map (block 430). For example, message configuration platform 230 may store (e.g., using computing resource 234, processor 320, memory 330, storage component 340, and/or the like) information identifying a mapping between a first set of third party identifiers included in the set of messages and a second set of third party identifiers associated with a digital map. In some implementations, message configuration platform 230 may have identified the first set of third party identifiers when processing messages in an electronic messaging account and the second set of third party identifiers may be used to search for locations of the set of third parties on a digital map.

In some implementations, message configuration platform 230 may store a data structure that includes an identifier for a third party extracted from a message and another identifier for the third party associated with a digital map. For example, the data structure may include an identifier from a domain name (e.g., "thirdpartyA" from the domain name "thirdpartyA.com") and a corresponding identifier associated with a digital map for the third party, such as "Third Party A." In some implementations, the data structure may include information identifying a set of messages associated with the third party. This facilitates fast and easy identification of messages associated with a third party, thereby reducing an amount of time needed to identify messages associated with a third party and/or conserving processing resources associated with identifying messages associated with the third party. In some implementations, message configuration platform 230 may store information identifying the mapping in server device 220.

In this way, message configuration platform 230 may store information identifying a mapping between a first set of third party identifiers and a second set of third party identifiers.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
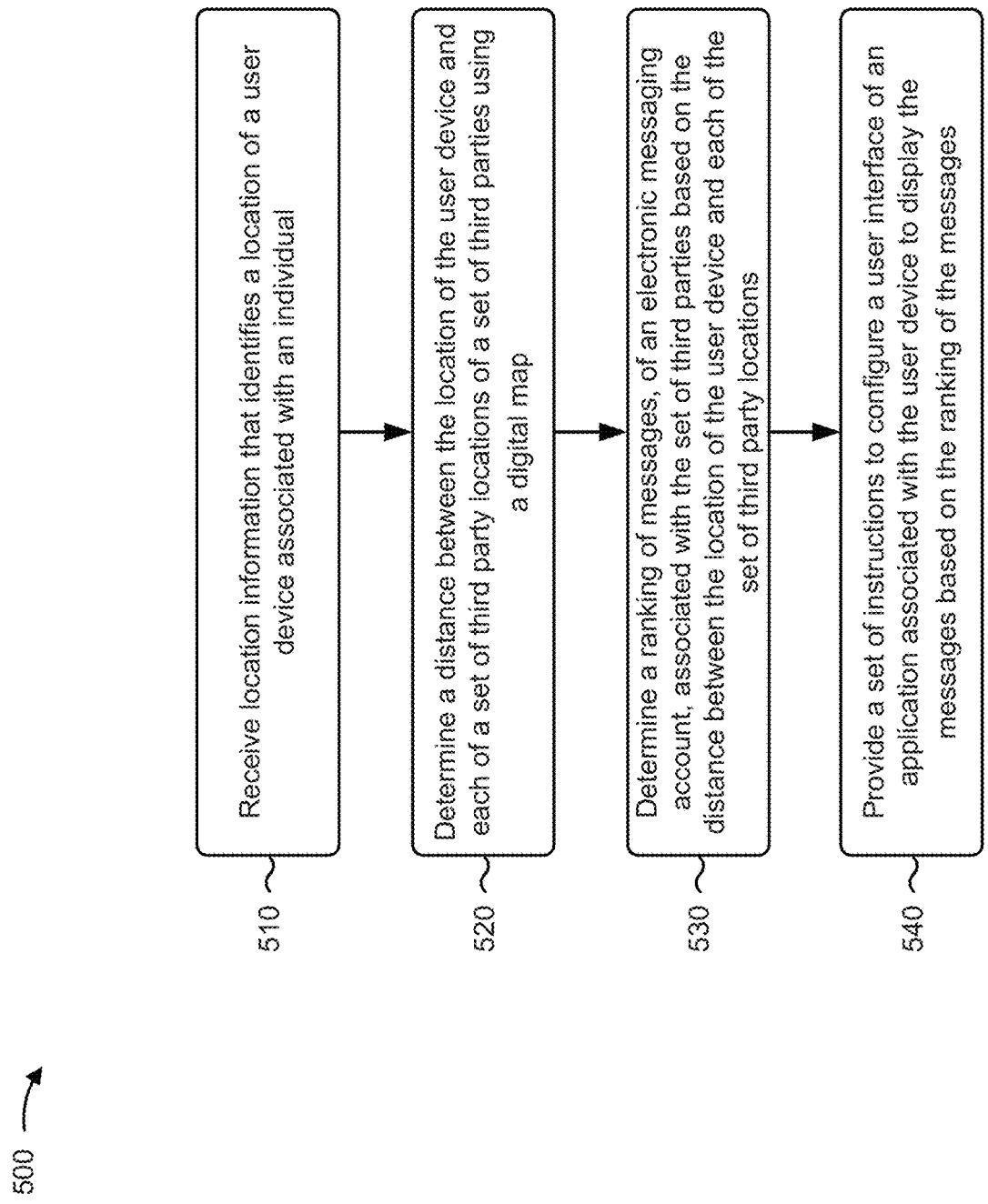
FIG. 5 is another flow chart of another example process for dynamic re-configuration of a user interface based on location information.

FIG. 5 is a flow chart of an example process 500 for dynamic re-configuration of a user interface based on location information. In some implementations, one or more process blocks of FIG. 5 may be performed by message configuration platform 230. In some implementations, one or more process blocks of FIG. 5 may be performed by another device or a group of devices separate from or including message configuration platform 230, such as user device 210, server device 220, and computing resource 234.

As shown in FIG. 5, process 500 may include receiving location information that identifies a location of a user device associated with an individual (block 510). For example, message configuration platform 230 may receive (e.g., using computing resource 234, processor 320, communication interface 370, and/or the like) location information that identifies a location of a user device associated with an individual. In some implementations, message configuration platform 230 may receive location information periodically, according to a schedule, based on requesting the location information, after a user of user device 210 has opted-in to providing location information to message configuration platform 230, in a streaming manner as a user of user device 210 moves about, and/or the like. In some implementations, message configuration platform 230 may receive location for thousands, millions, or more user devices 210, thereby receiving a data set that cannot be processed manually or objectively by a human actor.

In some implementations, location information may identify a location. For example, location information may include a set of coordinates, information identifying a geographic location, and/or the like. In some implementations, location information may identify a location of user device 210, an individual associated with user device 210, and/or the like. In some implementations, location information may be received from a sensor of user device 210 (e.g., a GPS component of user device 210 or based on communication with a beacon associated with a location, etc.). Additionally, or alternatively, location information may be input, by a user of user device 210, via a user interface displayed on a display of user device 210. In some implementations, message configuration platform 230 may receive location information in real-time or near-real time.

In some implementations, user device 210 may determine location information rather than message configuration platform 230 receiving location information. For example, an application installed on user device 210 may monitor location information from a sensor of user device 210 to determine a location of user device 210. Additionally, or alternatively, and as another example, user device 210 may determine a location (or future location) of user device 210 based on information from a navigation application. Continuing with the previous example, user device 210 may configure a user interface to display information related to messages associated with the location of user device 210 and/or a future location of user device 210, such as a destination input into the navigation application.

In this way, message configuration platform 230 may receive location information prior to determining a distance between a location of user device 210 and a location for a third party.

As further shown in FIG. 5, process 500 may include determining a distance between the location of the user device and each of a set of third party locations of a set of third parties using a digital map (block 520). For example, message configuration platform 230 may determine (e.g., using computing resource 234, processor 320, and/or the like) a distance between the location of user device 210 and each of a set of third party locations of a set of third parties using a digital map.

In some implementations, message configuration platform 230 may identify a location of user device 210 on the digital map using the location information. For example, message configuration platform 230 may perform a first search for the location of user device 210 on the digital map using the location information after receiving the location information. Continuing with the previous example, message configuration platform 230 may perform a search of a set of coordinates identified by the location information to identify a location of user device 210. In some implementations, when the digital map is hosted on server device 220 associated with another party, message configuration platform 230 may provide location information to server device 220 via an application programming interface (API) in association with a set of instructions for server device 220 to perform a search of the location information on the digital map. In this way, message configuration platform 230 may identify a location of user device 210 based on location information from user device 210.

In some implementations, message configuration platform 230 may identify each of a set of third party locations on the digital map after identifying the location of user device 210. For example, message configuration platform 230 may perform a search of a set of third party locations on the digital map using a set of third party identifiers that identify the set of third parties after performing the first search. In some implementations, the set of third party identifiers may correspond to a set of third party identifiers associated with a set of messages in an electronic messaging account.

In some implementations, message configuration platform 230 may provide the set of third party identifiers to server device 220 via an API in association with a set of instructions for server device 220 to perform a search of the third party identifiers on the digital map. In this way, message configuration platform 230 may identify a location of a set of third parties related to a set of messages in an electronic messaging account. In some implementations, if a result of the search identifies multiple locations for a third party, such as in the case when the third party is a business with multiple brick-and-mortar locations, message configuration platform 230 may select a location of the third party that is closest to the location of user device 210 for purposes of ranking messages, as described in more detail below.

In some implementations, message configuration platform 230 may determine a distance between the location of user device 210 and each of the set of third party locations for the set of third parties after identifying the location of user device 210 and each of the set of third party locations on the digital map. For example, message configuration platform 230 may determine a crow's flight distance, a driving distance, an estimated travel time (e.g., based on traffic, maximum road speeds, weather conditions, etc.), and/or the like between the location of user device 210 and the locations of each of the set of third parties. In some implementations, server device 220 may determine the distance, such as when the digital map is hosted by server device 220.

In some implementations, message configuration platform 230 may determine a distance between a location of user device 210 and a preferred location for a third party. For example, a user of user device 210 may visit a particular location for a third party more frequently than other locations, a third party may have a main location (compared to a secondary location), and/or the like, from which message configuration platform 230 may determine a distance of a location of user device 210. In some implementations, a user of user device 210 may input these preferences via an application on user device 210.

In some implementations, message configuration platform 230 may determine a ranking or an ordering for the set of third parties. For example, message configuration platform 230 may determine a ranking or an ordering for the set of third parties based on a distance a location for each of the set of third parties is from the location of user device 210. Continuing with the previous example, message configuration platform 230 may rank or order the set of third parties from a third party with a location closest to user device 210 to a third party with a location furthest from user device 210, or from a third party with a location furthest from a location of user device 210 to a third party with a location closest to the location of user device 210. This facilitates determining a ranking and/or an ordering of messages associated with the set of third parties.

In some implementations, message configuration platform 230 may receive an indication that the individual has opened an application on user device 210 prior to determining the distance between a location of user device 210 and locations of a set of third parties. For example, message configuration platform 230 may not determine the distance until a user of user device 210 has opened an application installed on user device 210 to view messages associated with the set of third parties. This conserves processing resources of message configuration platform 230 by reducing or eliminating a need for message configuration platform 230 to process information related to locations user device 210 and/or a set of third parties until a user of user device 210 requests the information.

In some implementations, user device 210, rather than message configuration platform 230, may determine a distance between the location of user device 210 and each location of a set of third parties. For example, an application may host a digital map and/or may be capable of communicating with server device 220 that hosts a digital map and may use the digital map to determine a distance between the location of user device 210 and each location of a set of third parties, similar to that described above.

In this way, message configuration platform 230 may determine a distance between the location of user device 210 and each of a set of third party locations prior to determining a ranking of messages associated with the set of third parties.

As further shown in FIG. 5, process 500 may include determining a ranking of messages, of an electronic messaging account, associated with the set of third parties based on the distance between the location of the user device and each of the set of third party locations (block 530). For example, message configuration platform 230 may determine (e.g., using computing resource 234, processor 320, and/or the like) a ranking of messages, of an electronic messaging account, associated with the set of third parties based on the distance between the location of user device 210 and each of the set of third party locations.

In some implementations, a ranking may indicate a priority, a relevance, and/or the like of a message. For example, a first ranking that is higher than a second ranking may indicate a higher priority, relevance, and/or the like for the first ranking relative to the second ranking. Continuing with the previous example, a higher ranking for a message and/or a third party relative to another message and/or another third party may indicate a higher priority, relevance, and/or the like for the message and/or third party relative to the other message and/or other third party.

In some implementations, message configuration platform 230 may determine a first ranking for a first set of messages, of the messages, associated with a third party, of the set of third parties, and may determine a second ranking for a second set of messages, of the messages, associated with another third party of the set of third parties (e.g., the first ranking may be higher relative to the second ranking). For example, the first and second rankings may be based on relative distances of locations for the third party and the other third party from the location of user device 210. Continuing with the previous example, the location of the third party may be closer to the location of user device 210 relative to the location of the other third party. In some implementations, message configuration platform 230 may determine a ranking of messages based on a ranking or ordering of locations of a set of third parties relative to user device 210.

In some implementations, message configuration platform 230 may determine a relative proximity of the location of user device 210 and each of the set of third party locations. For example, message configuration platform 230 may determine whether a location for a third party is closer to the location of user device 210 than another location for another third party. In some implementations, message configuration platform 230 may determine a relative proximity based on a ranking or ordering of locations of a set of third parties. In some implementations, message configuration platform 230 may determine a ranking of messages based on the relative proximity of locations of a set of third parties to user device 210. For example, messages associated with a third party that has a location closer to a location of user device 210 relative to another location of another third party may be ranked higher than messages associated with the other third party.

In some implementations, message configuration platform 230 may determine a score for each of the set of third parties based on one or more factors. For example, the one or more factors may include the distance between the location of user device 210 and each of the set of third party locations, a quantity of times a user of user device 210 has been at each of the set of third party locations (e.g., based on location information), and/or the like. In some implementations, message configuration platform 230 may determine a ranking of the set of third parties and/or associated messages based on the score for each of the set of third parties (e.g., by ranking the third parties and/or messages from highest score to lowest score, lowest score to highest scores, and/or the like.

In some implementations, message configuration platform 230 may determine a ranking of messages based on scores for a set of third parties. For example, the messages may be ranked from a highest score for a corresponding third party to a lowest score for a corresponding third party, from lowest score to highest score, and/or the like.

In some implementations, message configuration platform 230 may determine another ranking for each message, of the messages, associated with a third party, of the set of third parties, after determining the ranking of the set of third parties and/or messages associated with each of the set of third parties. For example, for a third party, message configuration platform 230 may separately rank messages associated with the third party relative to each other. In some implementations, message configuration platform 230 may determine the other ranking based on a combination of terms and/or phrases included in a message, a timestamp of when the message was received, a likelihood that a message is a particular type of message (e.g., an order confirmation, a coupon offer, a spam message, etc.) as determined using machine learning, and/or the like. In some implementations, the other ranking may be determined based on a score for each message for a third party, similar to that described above. In this way, not only are messages for a third party ranked relative to other third parties, but relative to each other for the third party. This further improves accessibility of messages that are likely to be relevant to the location of user device 210, as described elsewhere herein.

In some implementations, message configuration platform 230 may determine a manner in which the messages are to be provided for display based on the ranking of the set of third parties, after determining the other ranking for messages associated with a third party, based on the relative proximity of the location of user device 210 and each of the set of third party locations, and/or the like. For example, message configuration platform 230 may determine a manner in which user interface elements (e.g., text boxes, menus, buttons, etc.) are to be configured to display information related to the messages. For example, message configuration platform 230 may determine that user interface elements of a user interface are to be configured to display information for messages from the top of the user interface to the bottom of the user interface (e.g., from highest ranking to lowest ranking, from lowest ranking to highest ranking, etc.).

In some implementations, message configuration platform 230 may receive, from an electronic calendar associated with the individual, schedule information related to a schedule of the individual (e.g., from user device 210, server device 220, etc.). For example, the schedule information may identify scheduled events for the individual (e.g., a date, time, requirement for attendance, etc. for the scheduled event). In some implementations, message configuration platform 230 may determine a ranking for messages based on whether a scheduled event is upcoming within a threshold amount of time, whether user device 210 associated with the individual is at a location of a scheduled event, and/or the like.

In some implementations, message configuration platform 230 may identify which of the messages of the electronic messaging account are associated with the set of third parties prior to determining the ranking of the messages. For example, message configuration platform 230 may use a data structure to identify which messages are associated with each third party. Continuing with the previous example, message configuration platform 230 may identify the messages based on tags associated with the messages (e.g., a tag that identifies a third party associated with the message).

In some implementations, user device 210, rather than message configuration platform 230, may determine a ranking of messages. For example, an application installed on message configuration platform 230 may determine the ranking in a manner similar to that described above.

In this way, message configuration platform 230 may determine a ranking of messages prior to providing a set of instructions to configure a user interface to display the messages.

As further shown in FIG. 5, process 500 may include providing a set of instructions to configure a user interface of an application associated with the user device to display the messages based on the ranking of the messages (block 540). For example, message configuration platform 230 may provide (e.g., using computing resource 234, processor 320, communication interface 370, and/or the like) a set of instructions to configure a user interface of an application associated with user device 210 to display the messages based on the ranking of the messages (e.g., an email client, an electronic wallet, a shopping application, etc.).

In some implementations, message configuration platform 230 may receive, from user device 210, information that indicates that an application installed on user device 210 has been opened. In this case, message configuration platform 230 may provide the set of instructions after receiving the information that indicates that the application installed on user device 210 has been opened.

In some implementations, message configuration platform 230 may provide, to user device 210, the set of instructions to configure user interface elements of the user interface based on the ranking of the messages. For example, the user interface elements may display text related to the messages.

In some implementations, message configuration platform 230 may determine that a difference between the location of user device 210 and at least one of the set of third party locations satisfies a threshold and may provide, to user device 210, a notification for display related to the at least one of the set of third party locations. In this way, message configuration platform 230 may notify a user of user device 210 that the user is within a threshold distance of a third party location with which messages are associated.

In some implementations, message configuration platform 230 may provide another set of instructions to user device 210 to store a copy of a set of messages, of the messages, associated with a subset of the set of third parties that have a threshold ranking. For example, this facilitates offline access of the messages in the event that user device 210 loses connectivity to network 240.

In some implementations, message configuration platform 230 may receive updated location information after providing the set of instructions to user device 210. For example, message configuration platform 230 may receive updated location information as a user of user device 210 is moved about among a set of locations (e.g., in real-time or near real-time). In some implementations, message configuration platform 230 may modify the ranking of the messages based on the updated location information. In some implementations, message configuration platform 230 may provide additional sets of instructions to reconfigure the user interface based on updated location information. For example, the updated location information may identify an updated location of user device 210.

In some implementations, user device 210, rather than message configuration platform 230, may perform these or similar actions. For example, an application on user device 210 may configure user interface elements of a user interface associated with the application to display the messages, or information related to the messages, in a particular manner. Additionally, or alternatively, and as another example, the application may output a notification (e.g., a message, a sound output, a vibration, etc.), and/or may open an application on user device 210 when user device 210 is within a threshold distance of a third party location with which a set of messages is associated.

In this way, message configuration platform 230 may provide a set of instructions to configure a user interface of an application to display the messages based on the ranking.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
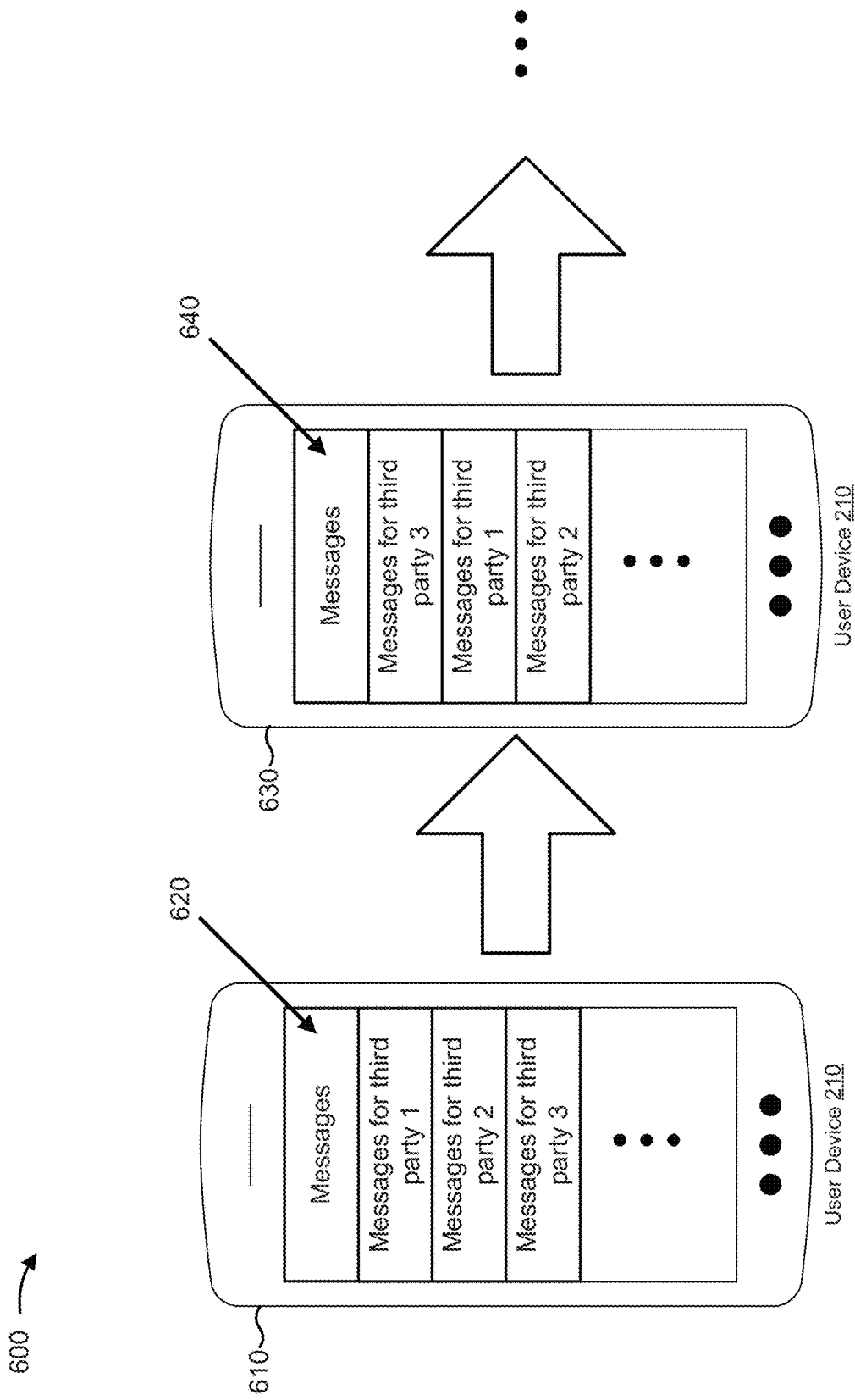
FIG. 6 is a diagram of an example implementation related to the example process shown in FIG. 4 and/or the example process shown in FIG. 5.

FIG. 6 shows a diagram of an example implementation 600 related to example process 400 shown in FIG. 4 and/or example process 500 shown in FIG. 5. For example, FIG. 6 shows an example of a user interface of user device 210 being re-configured based on a location of user device 210. As shown in FIG. 6, example implementation 600 includes user device 210.

As shown in FIG. 6, and by reference number 610, user device 210 may be at a particular location (e.g., a location associated with third party 1). For example, a user of user device 210 may have moved user device 210 to a third party location associated with third party 1. As shown by reference number 620, a user interface of an application may be configured in a particular manner. For example, messages associated with third party 1 may be displayed toward the top of the user interface (e.g., indicating a higher ranking for the messages relative to other messages displayed lower on the user interface). This facilitates quick and easy access to messages associated with third party 1 when user device 210 is at, or near, a location of third party 1, and conserves processor resources relative to requiring the user to search for messages.

As shown by reference number 630, user device 210 may have been moved to another third party location (e.g., a location associated with third party 3). As shown by reference number 640, the user interface has been re-configured so that messages associated with third party 3 are displayed toward the top of the user interface. In this way, the user interface has been reconfigured based on a ranking of messages being updated as user device 210 is moved from one third party location to another.

In some implementations, the functionality described herein can be toggled on and off (e.g., via a control on a user interface associated with an application on user device 210). This provides a user of user device 210 with control over when location information is shared with message configuration platform 230, conserves processing resources of user device 210 and/or message configuration platform 230, and/or the like.

As indicated above, FIG. 6 is provided merely as an example. Other examples are possible and may differ from what was described above with regard to FIG. 6.

Figure 7:
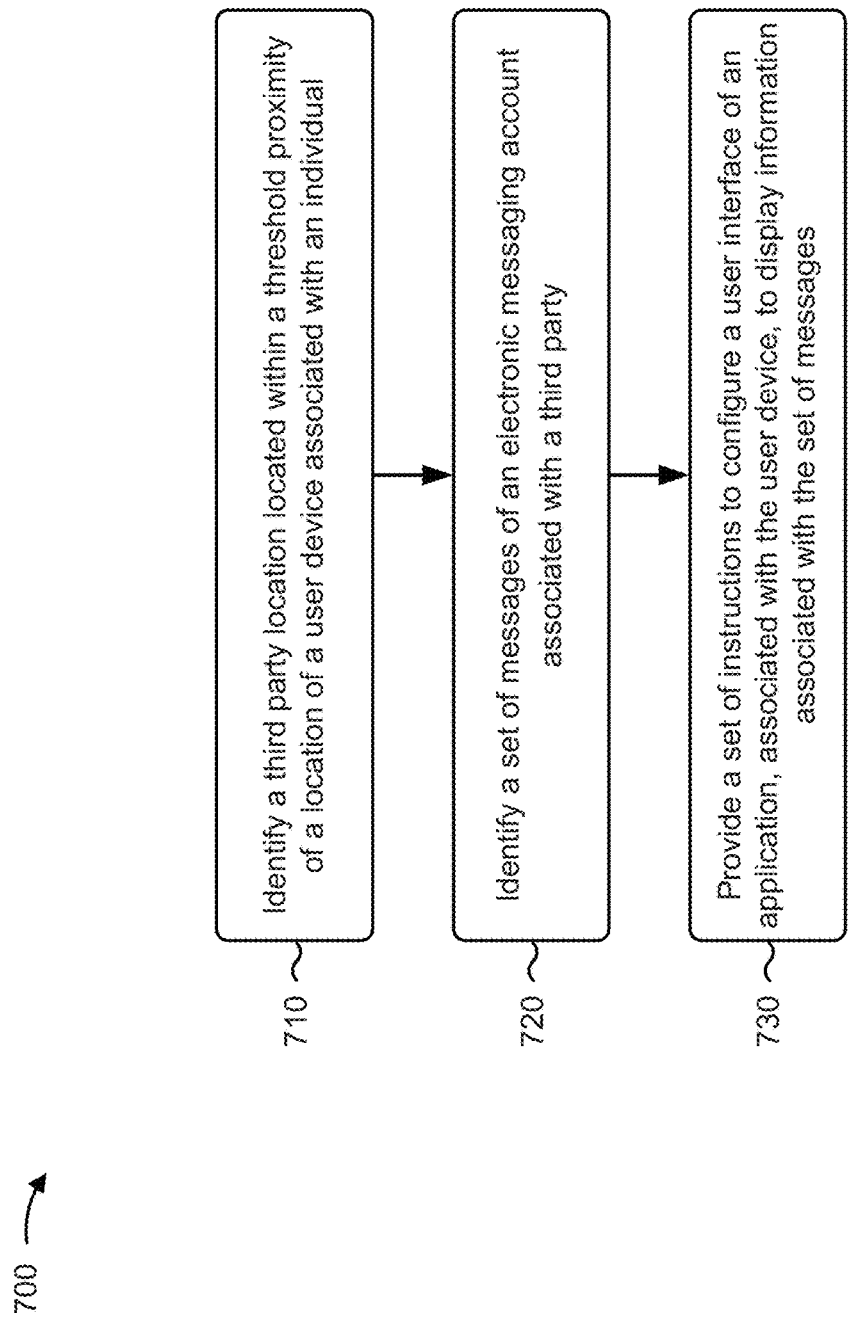
FIG. 7 is another flow chart of another example process for dynamic re-configuration of a user interface based on location information.

FIG. 7 is a flow chart of an example process 700 for dynamic re-configuration of a user interface based on location information. In some implementations, one or more process blocks of FIG. 7 may be performed by message configuration platform 230. In some implementations, one or more process blocks of FIG. 7 may be performed by another device or a group of devices separate from or including message configuration platform 230, such as user device 210, server device 220, and computing resource 234.

As shown in FIG. 7, process 700 may include identifying a third party location located within a threshold proximity of a location of a user device associated with an individual (block 710). For example, message configuration platform 230 may identify (e.g., using computing resource 234, processor 320, and/or the like) a third party location located within a threshold proximity of a location of user device 210 associated with an individual.

In some implementations, message configuration platform 230 may perform a search of a location of user device 210 on a digital map using location information from user device 210. In addition, message configuration platform 230 may perform a search of one or more third party locations on the digital map (e.g., by performing a search of a third party identifier associated with each third party corresponding to each of the one or more third party locations, by performing a search using information that identifies the one or more third party locations, etc.). In some implementations, when performing a search of third party locations, message configuration platform 230 may perform a search for third party locations of third parties identified in messages of an electronic messaging account. This reduces or eliminates a need for message configuration platform 230 to perform a search for all third party locations within a threshold distance of user device 210.

In some implementations, message configuration platform 230 may identify a third party location that is within a threshold proximity of a location of user device 210 based on a result of performing the search on the digital map for the one or more third party locations and the location of user device 210. For example, a result of the search may include information identifying a distance of each of the one or more third party locations from the location of user device 210 and message configuration platform 230 may filter the search results based on a threshold proximity (e.g., third party locations within 15 kilometers, within 500 meters, etc. of a location of user device 210). Additionally, or alternatively, when performing the search, message configuration platform 230 may configure a parameter of the search so that a result of the search includes results within a threshold proximity of the location of user device 210.

In this way, message configuration platform 230 may identify a third party location located within a threshold proximity of a location of user device 210 prior to identifying a set of messages of an electronic messaging account associated with the individual.

As further shown in FIG. 7, process 700 may include identifying a set of messages of an electronic messaging account associated with a third party (block 720). For example, message configuration platform 230 may identify (e.g., using computing resource 234, processor 320, and/or the like) a set of messages of an electronic messaging account associated with the third party.

In some implementations, message configuration platform 230 may process messages of an electronic messaging account to identify third parties associated with the messages. For example, message configuration platform 230 may process the messages using a text processing technique, an image processing technique, a machine learning technique, and/or the like, in a manner similar to that described elsewhere herein. In some implementations, message configuration platform 230 may tag messages so that the messages can be identified as being associated with particular third parties, in a manner similar to that described elsewhere herein.

In some implementations, message configuration platform 230 may identify a set of messages associated with a third party by identifying a set of messages that have been tagged as being associated with the third party (e.g., a set of messages that have been pre-tagged as being associated with the third party). For example, message configuration platform 230 may identify, in a data structure or in the electronic messaging account, a set of tagged messages that is associated with the third party.

In this way, message configuration platform 230 may identify a set of messages of an electronic messaging account prior to providing a set of instructions to configure a user interface of an application.

As further shown in FIG. 7, process 700 may include providing a set of instructions to configure a user interface of an application, associated with the user device, to display information associated with the set of messages (block 730). For example, message configuration platform 230 may provide (e.g., using computing resource 234, processor 320, communication interface 370, and/or the like) a set of instructions to configure a user interface of an application, associated with user device 210, to display information associated with the set of messages.

In some implementations, message configuration platform 230 may provide a set of instructions to configure a user interface in a manner similar to that described elsewhere herein. In some implementations, the set of instructions may cause information related to the set of messages to be provided for display in a prioritized manner (e.g., ranked or ordered) within an email client. Additionally, or alternatively, the set of instructions may cause information to be provided for display in a prioritized manner outside of an email client (e.g., in an application that is not the email client, such as an electronic wallet or other dedicated application). Additionally, or alternatively, the set of instructions may cause a notification to be provided for display that identifies that messages associated with the third party location are in the electronic messaging account. In some implementations, selection of the notification may cause an application and/or user interface, which displays information related to the set of messages, to open on user device 210. For example, the application may be an email client, an electronic wallet, a shopping application, and/or the like.

In some implementations, the set of instructions may cause messages associated with the closest third party location to be provided for display, when a location of user device 210 is within a threshold proximity of a third party location (e.g., when user device 210 is at the third party location), or when a location of user device 210 is predicted to be within a threshold proximity of a third party location (e.g., when user device 210 is predicted to be at the third party location within a threshold amount of time). For example, message configuration platform 230 may determine that user device 210 is at a third party location based on location information related to user device 210 and the third party (e.g., by determining on a digital map, that user device 210 is at, or within a threshold distance of, a third party location for the third party). This conserves processing resources of user device 210 by reducing an amount of information that user device 210 provides for display.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

In this way, message configuration platform 230 dynamically prioritizes messages in an electronic messaging account based on a location of user device 210 so that the messages are quickly and easily accessible by a user of user device 210 when the user is at a third party location. This reduces or eliminates a need for the user to perform a search for the messages, thereby conserving processing resources of devices associated with hosting and/or accessing the electronic messaging account. In addition, this increases an accessibility of messages based on a location of user device 210, thereby improving the manner in which the user is provided with access to messages. Further, this conserves processing resources that would otherwise be consumed via manual use of a user interface to perform a search for messages associated with a location.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    identifying, by a device, a third party location of a third party located within a threshold proximity of a location of a user device associated with an individual;
    identifying, by the device and based on analysis of messages associated with an electronic messaging account, a set of messages associated with the third party;
    providing, by the device, a set of instructions to configure a user interface of an application associated with the user device to display information associated with the identified set of messages,
        the set of instructions to cause the information associated with the identified set of messages associated with the third party to be displayed when the third party location of the third party is within the threshold proximity of the location of the user device, and
        the information associated with the identified set of messages being arranged in a ranking according to a type of message of different types of messages;
    receiving, by the device, updated location information from the user device based on providing the set of instructions to the user device; and
    transmitting, by the device and based on the updated location information, instructions to the user device to update one or more of the display of the information associated with the identified set of messages, the ranking associated with the identified set of messages, or the user interface of the application associated with the user device.

2. The method of claim 1, wherein providing the set of instructions comprises:
    providing the set of instructions to configure user interface elements of the user interface based on the ranking of the identified set of messages,
        wherein the user interface elements are to display text related to the identified set of messages.

3. The method of claim 1, further comprising:
    utilizing machine learning to distinguish between the different types of messages of the identified set of messages.

4. The method of claim 1, further comprising:
    determining that a difference between the location of the user device and at least one of a set of third party locations satisfies a threshold; and
    providing, to the device, a notification for display related to the at least one of the set of third party locations.

5. The method of claim 1, wherein information identifying the threshold proximity is input by the user device.

6. The method of claim 1, wherein the identified set of messages are displayed within an email client.

7. The method of claim 1, further comprising:
    tagging the set of messages associated with the third party, and
    where identifying the set of messages associated with the third party comprises:

identifying the set of messages associated with the third party based upon the set of messages being tagged.

8. A device, comprising:
one or more memories; and
one or more processors communicatively coupled to the one or more memories, configured to:
identify a third party location of a third party located within a threshold proximity of a location of a user device associated with an individual;
identify a set of messages associated with the third party;
provide a set of instructions to configure a user interface of an application associated with the user device to display information associated with the identified set of messages,
the information associated with the identified set of messages being arranged in a ranking according to a type of message of different types of messages;
receive updated location information from the user device based on providing the set of instructions to the user device; and
transmit, based on the updated location information, instructions to the user device to update one or more of the display of the information associated with the identified set of messages, the ranking of the identified set of messages, or the user interface of the application associated with the user device.

9. The device of claim 8, wherein the one or more processors, when providing the set of instructions, are configured to:
provide the set of instructions to configure user interface elements of the user interface based on the ranking of the identified set of messages,
wherein the user interface elements are to display text related to the identified set of messages.

10. The device of claim 8, wherein the one or more processors are further configured to:
receive, from the user device, information that indicates that the application associated with the user device has been opened; and
where the one or more processors, when providing the set of instructions, are configured to:
provide the set of instructions after receiving the information that indicates that the application associated with the user device has been opened.

11. The device of claim 8, wherein the one or more processors are further configured to:
determine that a difference between the location of the user device and at least one of a set of third party locations satisfies a threshold; and
provide, to the device, a notification for display related to the at least one of the set of third party locations.

12. The device of claim 8, wherein the one or more processors, when identifying that the third party location is within the threshold proximity of the location of the user device, are to:
identify the third party location of the third party located within the threshold proximity of the location of the user device based on a result of performing a search on a digital map associated with one or more third party locations and the location of the user device.

13. The device of claim 8, wherein the identified set of messages are displayed outside an email client.

14. The device of claim 8, wherein the one or more processors are further configured to:
tag the set of messages associated with the third party, and
where the one or more processors, when identifying the set of messages associated with the third party, are to:
identify the set of messages associated with the third party based upon the set of messages being tagged.

15. A non-transitory computer-readable medium storing instructions, the instructions comprising:
one or more instructions that, when executed by one or more processors, cause the one or more processors to:
receive location information from a sensor of a user device associated with an individual,
where the location information identifies a location of the user device,
where the individual is associated with an electronic messaging account that includes messages associated with a set of third parties;
identify a third party location of a third party, of the set of third parties, located within a threshold proximity of the location of the user device;
identify, based on analysis of messages associated with the electronic messaging account, a set of messages associated with the third party;
provide a set of instructions to configure a user interface of an application associated with the user device to display information associated with the identified set of messages,
the information associated with the identified set of messages being arranged in a ranking according to a type of message of different types of messages;
receive updated location information from the user device based on providing the set of instructions to the user device; and
transmit, based on the updated location information, instructions to the user device to update one or more of the display of the information associated with the identified set of messages, the ranking of the identified set of messages, or the user interface of the application associated with the user device.

16. The non-transitory computer-readable medium of claim 15, wherein the one or more instructions, that cause the one or more processors to provide the set of instructions, cause the one or more processors to:
receive, from an electronic calendar associated with the individual, schedule information related to a schedule of the individual; and
determine a ranking of the set of third parties based on the schedule information.

17. The non-transitory computer-readable medium of claim 15, wherein the one or more instructions, when executed by the one or more processors, further cause the one or more processors to:
utilize machine learning to distinguish between the different types of messages of the identified set of messages.

18. The non-transitory computer-readable medium of claim 15, wherein the one or more instructions, when executed by the one or more processors, further cause the one or more processors to:
determine that a difference between the location of the user device and at least one of a set of third party locations satisfies a threshold; and
provide a notification for display related to the at least one of the set of third party locations.

19. The non-transitory computer-readable medium of claim 15, herein the one or more instructions, when executed by the one or more processors, further cause the one or more processors to:

cause the information associated with the identified set of messages associated with the third party to be displayed when at least one of:
 the third party location of the third party is within the threshold proximity of the location of the user device, or
 the third party location of the third party is predicted to be within the threshold proximity of the location of the user device.

20. The non-transitory computer-readable medium of claim 15, wherein the one or more instructions, when executed by the one or more processors, further cause the one or more processors to:
 tag the set of messages associated with the third party, and wherein the one or more instructions, that cause the one or more processors to identify the set of messages associated with the third party, cause the one or more processors to:
  identify the set of messages associated with the third party based upon the set of messages being tagged.

\* \* \* \* \*